United States Patent
Oh et al.

(10) Patent No.: US 12,281,213 B2
(45) Date of Patent: Apr. 22, 2025

(54) POLYAMIDE-IMIDE FILM, PREPARATION METHOD THEREOF, AND DISPLAY FRONT PLATE AND DISPLAY DEVICE COMPRISING SAME

(71) Applicant: SK microworks Co., Ltd., Gyeonggi-do (KR)

(72) Inventors: Dae Seong Oh, Seoul (KR); Jung Hee Ki, Gyeonggi-do (KR); Sunhwan Kim, Incheon (KR); Han Jun Kim, Gyeonggi-do (KR); Jin Woo Lee, Seoul (KR); Sang Hun Choi, Seoul (KR)

(73) Assignee: SK MICROWORKS CO., LTD., Gyeonggi-do (KR)

(*) Notice: Subject to any disclaimer, the term of this patent is extended or adjusted under 35 U.S.C. 154(b) by 235 days.

(21) Appl. No.: 16/913,092

(22) Filed: Jun. 26, 2020

(65) Prior Publication Data
US 2020/0407521 A1    Dec. 31, 2020

(30) Foreign Application Priority Data

Jun. 28, 2019 (KR) .................. 10-2019-0078286
Dec. 16, 2019 (KR) .................. 10-2019-0167993

(51) Int. Cl.
| | | |
|---|---|---|
| C08J 5/18 | (2006.01) | |
| C08G 73/10 | (2006.01) | |
| C08G 73/14 | (2006.01) | |
| C08K 3/36 | (2006.01) | |

(52) U.S. Cl.
CPC ............ *C08J 5/18* (2013.01); *C08G 73/1007* (2013.01); *C08G 73/14* (2013.01); *C08J 2379/08* (2013.01); *C08K 3/36* (2013.01)

(58) Field of Classification Search
CPC ......... C08L 79/08; C08J 2379/08; C08J 5/18; C08G 73/14; C08K 3/03
See application file for complete search history.

(56) References Cited

U.S. PATENT DOCUMENTS

| | | | |
|---|---|---|---|
| 2015/0152232 A1* | 6/2015 | Ju | ............................... C08J 5/18 524/442 |
| 2018/0044475 A1* | 2/2018 | Park | .................. C08G 73/1042 |
| 2019/0153161 A1 | 5/2019 | Ryu et al. | |

FOREIGN PATENT DOCUMENTS

| | | |
|---|---|---|
| CN | 109476914 A | 3/2019 |
| JP | 2018153974 * | 10/2018 |
| KR | 10-2014-0002521 A | 1/2014 |
| KR | 10-2017-0079114 A | 7/2017 |
| KR | 10-1831884 B1 | 2/2018 |

OTHER PUBLICATIONS

Office Action for the Chinese Patent Application No. 202010601277.5 issued by the Chinese Patent Office on Oct. 28, 2022.

* cited by examiner

*Primary Examiner* — Gregory Listvoyb
(74) *Attorney, Agent, or Firm* — IP & T GROUP LLP

(57) ABSTRACT

Embodiments relate to a polyamide-imide film that has a clean appearance and transparency and is excellent in anti-blocking properties, a process for preparing the same, and a display front panel and a display device comprising the same. The polyamide-imide film comprises a polyamide-imide polymer formed by polymerizing a diamine compound, a dianhydride compound, and a dicarbonyl compound; and a filler, wherein the dicarbonyl compound comprises a first dicarbonyl compound and a second dicarbonyl compound, the first dicarbonyl compound and the second dicarbonyl compound are structural isomers to each other, and the FH value of Equation 1 is 0.5 or less.

7 Claims, 3 Drawing Sheets

POLYAMIDE-IMIDE FILM, PREPARATION METHOD THEREOF, AND DISPLAY FRONT PLATE AND DISPLAY DEVICE COMPRISING SAME

The present application claims priority of Korean patent application numbers 10-2019-0078286 filed on Jun. 28, 2019 and 10-2019-0167993 filed on Dec. 16, 2019. The disclosure of each of the foregoing applications is incorporated herein by reference in its entirety.

TECHNICAL FIELD

Embodiments relate to a polyamide-imide film that has a clean appearance and transparency and is excellent in antiblocking properties, a process for preparing the same, and a display front panel and a display device comprising the same.

BACKGROUND ART OF THE INVENTION

Polyimide-based resins such as poly(amide-imide) (PAI) are excellent in resistance to friction, heat, and chemicals. Thus, they are employed in such applications as primary electrical insulation, coatings, adhesives, resins for extrusion, heat-resistant paintings, heat-resistant boards, heat-resistant adhesives, heat-resistant fibers, and heat-resistant films.

Polyimide is used in various fields. For example, polyimide is made in the form of a powder and used as a coating for a metal or a magnetic wire. It is mixed with other additives depending on the application thereof. In addition, polyimide is used together with a fluoropolymer as a painter for decoration and corrosion prevention. It also plays a role of bonding a fluoropolymer to a metal substrate. In addition, polyimide is used to coat kitchenware, used as a membrane for gas separation by virtue of its heat resistance and chemical resistance, and used in natural gas wells for filtration of such contaminants as carbon dioxide, hydrogen sulfide, and impurities.

In recent years, polyimide has been developed in the form of a film, which is less expensive and has excellent optical, mechanical, and thermal characteristics. Such a polyamide-imide-based film may be applied to display materials for organic light-emitting diodes (OLEDs), liquid crystal displays (LCDs), and the like, and to antireflection films, compensation films, and retardation films when phase difference properties are implemented.

Such a polyamide-imide-based film should be smoothly wound up without any defects such as scratches by smoothly sliding on the interface with a guide roll of high hardness that it undergoes in the production process.

In the conventional polyamide-imide-based films, additives have been added to impart antiblocking properties. However, since the additives used in the polymer contained in the film and having a high amide content act as a nucleus, particles are aggregated or precipitated on the surface of the film, thereby causing such problems as increased haze and yellow index or a poor film appearance.

Accordingly, there has been a continuous demand for research on the development of a film having a clean appearance and excellent antiblocking properties without deteriorating the optical properties and mechanical properties.

DISCLOSURE OF THE INVENTION

Problem to be Solved

Embodiments aim to provide a polyamide-imide film that has a clean appearance and transparency and is excellent in antiblocking properties, a process for preparing the same, and a display front panel and a display device comprising the same.

Solution to the Problem

The polyamide-imide film according to an embodiment comprises a polyamide-imide polymer formed by polymerizing a diamine compound, a dianhydride compound, and a dicarbonyl compound; and a filler, wherein the dicarbonyl compound comprises a first dicarbonyl compound and a second dicarbonyl compound, the first dicarbonyl compound and the second dicarbonyl compound are structural isomers to each other, and the FH value of the following Equation 1 is 0.5 or less.

$$FH = \frac{FC}{2000 \text{ ppm}} \times \frac{HZ}{1\%} \qquad [\text{Equation 1}]$$

In Equation 1, FC is the content (ppm) of the filler based on the total weight of the solids content in the polymer, and HZ stands for the haze (%) of the film.

The display front panel according to another embodiment comprises a polyamide-imide film and a functional layer, wherein the polyamide-imide film comprises a polyamide-imide polymer and a filler, and the FH value of the above Equation 1 is 0.5 or less.

The display device according to still another embodiment comprises a display unit; and a display front panel disposed on the display unit, wherein the display front panel comprises a polyamide-imide film, the polyamide-imide film comprises a polyamide-imide polymer and a filler, and the FH value of the above Equation 1 is 0.5 or less.

The process for preparing a polyamide-imide film according to an embodiment comprises polymerizing a diamine compound, a dianhydride compound, and a dicarbonyl compound in an organic solvent to prepare a polyamide-imide polymer solution; adjusting the viscosity of the polyamide-imide polymer solution to 250,000 cps to 450,000 cps; adding a filler dispersion in which a filler is dispersed to the polymer solution; charging the polymer solution into a tank; extruding and casting the polymer solution in the tank and then drying it to prepare a gel sheet; and thermally treating the gel sheet.

Advantageous Effects of the Invention

The polyamide-imide film according to the embodiment is excellent in not only antiblocking properties but also mechanical properties and optical properties.

In addition, the polyamide-imide film according to the embodiment has few defects such as scratches, has excellent flexural characteristics, and is excellent in haze and transmittance. Thus, it can be advantageously used in a display front panel and a display device.

In the process for preparing a polyamide-imide film according to the embodiment, the viscosity of the polymer solution and the drying temperature are adjusted, whereby it is possible to achieve an advantageous effect attributable to the addition of a filler without increasing the haze.

DETAILED DESCRIPTION FOR CARRYING OUT THE INVENTION

Figure 1:
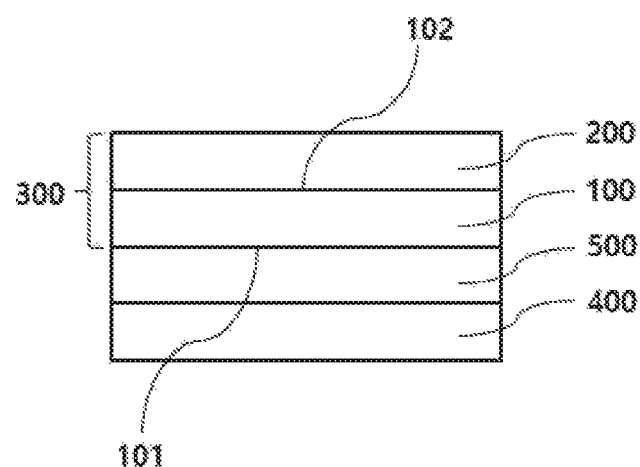
FIG. 1 is a cross-sectional view of a display device according to an embodiment.

Hereinafter, the embodiments will be described in detail with reference to the accompanying drawings so that those skilled in the art to which the present invention pertains may easily practice them. However, the embodiments may be implemented in many different ways and are not limited to those described herein.

Throughout the present specification, in the case where each film, window, panel, layer, or the like is mentioned to be formed "on" or "under" another film, window, panel, layer, or the like, it means not only that one element is directly formed on or under another element, but also that one element is indirectly formed on or under another element with other element(s) interposed between them. In addition, the term on or under with respect to each element may be referenced to the drawings. For the sake of description, the sizes of individual elements in the appended drawings may be exaggeratedly depicted and do not indicate the actual sizes. In addition, the same reference numerals refer to the same elements throughout the specification.

Throughout the present specification, when a part is referred to as "comprising" an element, it is understood that other elements may be comprised, rather than other elements are excluded, unless specifically stated otherwise.

In the present specification, a singular expression is interpreted to cover a singular or plural number that is interpreted in context unless otherwise specified.

In addition, all numbers and expression related to the quantities of components, reaction conditions, and the like used herein are to be understood as being modified by the term "about," unless otherwise indicated.

The terms first, second, and the like are used herein to describe various elements, and the elements should not be limited by the terms. The terms are used only for the purpose of distinguishing one element from another.

In addition, the term "substituted" as used herein means to be substituted with at least one substituent group selected from the group consisting of deuterium, —F, —Cl, —Br, —I, a hydroxyl group, a cyano group, a nitro group, an amino group, an amidino group, a hydrazine group, a hydrazone group, an ester group, a ketone group, a carboxyl group, a substituted or unsubstituted alkyl group, a substituted or unsubstituted alkenyl group, a substituted or unsubstituted alkynyl group, a substituted or unsubstituted alkoxy group, a substituted or unsubstituted alicyclic organic group, a substituted or unsubstituted heterocyclic group, a substituted or unsubstituted aryl group, and a substituted or unsubstituted heteroaryl group. The substituent groups enumerated above may be connected to each other to form a ring.

Polyamide-Imide Film

Embodiments provide a polyamide-imide film that has a clean appearance and transparency and is excellent in anti-blocking properties.

The polyamide-imide film according to an embodiment comprises a polyamide-imide polymer and a filler. The polyamide-imide polymer is prepared by polymerizing a diamine compound, a dianhydride compound, and a dicarbonyl compound.

Specifically, the dicarbonyl compound comprises a first dicarbonyl compound and a second dicarbonyl compound. The first dicarbonyl compound and the second dicarbonyl compound are structural isomers to each other.

In the polyamide-imide film, the FH value of the following Equation 1 is 0.5 or less.

$$FH = \frac{FC}{2000\ \text{ppm}} \times \frac{HZ}{1\%} \qquad \text{[Equation 1]}$$

In Equation 1, FC is the content (ppm) of the filler based on the total weight of the solids content in the polymer, and HZ stands for the haze (%) of the film.

The content (FC) of the filler is 1 ppm when the filler is 1 g and the solids content in the polymer is 1,000,000 g.

Specifically, the FH value of the polyamide-imide film may be 0.4 or less, 0.3 or less, less than 0.3, or 0.25 or less, but it is not limited thereto.

The content of the filler and the haze of the film are variables in the FH value, which is a value represented by the correlation between them.

In general, as the filler content is increased, such defects as scratches decrease as the slip properties are excellent, whereas the haze increases, resulting in a rapid deterioration in the optical properties. On the other hand, as the filler content is decreased, the slip properties described above are lowered, resulting in a problem that the mechanical properties are deteriorated.

Thus, when both the mechanical properties and the optical properties at a certain level or higher are achieved by increasing the filler content and lowering the haze, the film can be advantageously applied to a display front panel and a display device.

In the polyamide-imide film according to an embodiment, if the FH value, which is a parameter value where the content of the filler and the haze are variables, is within the above range, the rollability when wound in a roll shape and the sliding performance in the production process are excellent, so that no defects such as scratches or wrinkles are generated. Further, since the film is excellent in transmittance, haze, and yellow index and has a high modulus, it can be advantageously applied to a display front panel and a display device. That is, if the FH value of the polyamide-imide film is within the above range, it may have mechanical properties and optical properties suitable to be applied to a display front panel and a display device.

Specifically, if the FH value of the polyamide-imide film exceeds the above range, the haze and yellow index are remarkably high. Or the filler may aggregate with each other, resulting in a feeling of foreign matter on the film surface.

The type of filler is not particularly limited as long as it is a material capable of imparting various functions to a polyamide-imide film.

For example, the filler may be a UV absorber having a UV blocking function to protect the inside of a display, an inorganic material with an antiblocking function for good winding and unwinding during the film production process, a pigment with a color adjustment function to impart an aesthetic feeling to a film, or the like. But it is not limited thereto.

Specifically, the UV absorber may be at least one selected from benzophenone-based compounds, benzotriazole-based compounds, and triazine-based compounds. The inorganic material may be a silica-based material. The pigment may be at least one selected from C.I. Pigment Red 108, Cadmium zinc sulfide, C.I. Pigment Green 50, and C.I. Pigment Blue 28. But they are not limited thereto.

More specifically, the filler may be a silica-based material. The filler has an average particle diameter of 70 nm to 120 nm. Specifically, the average particle diameter of the filler may be 70 nm to 110 nm, 80 nm to 120 nm, 80 nm to 110 nm, or 80 nm to 100 nm, but it is not limited thereto.

The content of the filler is 300 to 2,000 ppm based on the total weight of the polyamide-imide polymer. Specifically, the content of the filler may be 300 to 1,500 ppm, 300 to 1,200 ppm, 300 to 1,000 ppm, 500 to 1,000 ppm, 300 to 800 ppm, 400 to 800 ppm or 500 to 800 ppm, based on the total weight of the polyamide-imide polymer, but it is not limited thereto.

If the particle size and the content of the filler satisfy the above ranges, the film has excellent antiblocking properties, whereby the rollability when wound in a roll shape and the sliding performance in the production process are excellent. In addition, since the film has excellent slip properties, it has few defects such as scratches at the time of winding and unwinding. Thus, it can be advantageously applied to a display front panel and a display device.

If the particle size and the content of the filler are less than the above ranges, a proper level of antiblocking properties is not achieved, resulting in an increase in the defects of the film. If they exceed the above ranges, the haze is rapidly increased and the transmittance is rapidly decreased, resulting in a problem that a transparent and clean appearance is not achieved.

In the polyamide-imide film, the IS value represented by the following Equation 3 is 5 to 100.

$$IS = IM + \frac{RS}{10} \qquad \text{[Equation 3]}$$

In Equation 3, IM stands for the number of moles of the imide repeat unit when the total number of moles of the imide repeat unit and the amide repeat unit in the film is 100; and RS stands for the content (ppm) of the residual solvent in the film.

For example, the IS value may be 5 to 80, 5 to 60, or 5 to 50, but it is not limited thereto.

If the IS value of the polyamide-imide film satisfies the above range, a film having excellent folding characteristics can be obtained by virtue of its excellent durability.

In particular, if the above range is exceeded since the imide content (IM) is high or the content of the residual solvent (RS) is high, the long-term durability of the film is rapidly deteriorated. Specifically, if the imide content is too high and the amide content is thus relatively reduced, such mechanical properties as modulus and hardness of the film are deteriorated.

The content of the residual solvent in the polyamide-imide film according to an embodiment is 900 ppm or less. For example, the content of the residual solvent may be 800 ppm or less, 700 ppm or less, 500 ppm or less, or 300 ppm or less, but it is not limited thereto.

The residual solvent refers to the amount of solvents that are not volatilized during the film production and remains in the film finally produced.

If the content of the residual solvent in the polyamide-imide film exceeds the above range, the durability of the film may be deteriorated, which, in particular, may have an impact on the subsequent processing of the film. Specifically, if the content of the residual solvent exceeds the above range, the hydrolysis of the film is expedited, resulting in a deterioration in the mechanical properties or the optical properties.

When the polyamide-imide film according to an embodiment based on a thickness of 50 μm is folded to have a radius of curvature of 2 mm, the number of folding before the fracture is 100,000 or more.

The number of folding counts one when the film is folded to have a radius of curvature of 2 mm and then unfolded.

As the number of folding of the polyamide-imide film satisfies the above range, it can be advantageously applied to a foldable display device or a flexible display device.

The polyamide-imide film according to an embodiment comprises a polyamide-imide polymer formed by polymerizing a diamine compound, a dianhydride compound, and a dicarbonyl compound.

The molar ratio of the dianhydride compound and the dicarbonyl compound is 2:98 to 50:50. Specifically, the molar ratio of the dianhydride compound and the dicarbonyl compound is 2:98 to 45:55, 2:98 to 40:60, 2:98 to 30:70, 2:98 to 25:75, 3:97 to 25:75, 2:98 to 20:80, 3:97 to 20:80, 2:98 to 15:85, 3:97 to 15:85, 2:98 to 25:75, or 2:98 to 15:85.

If the molar ratio of the dianhydride compound and the dicarbonyl compound is within the above range, a film having high durability and excellent mechanical properties and optical properties can be obtained.

Specifically, if the dianhydride compound is more than the dicarbonyl compound, based on the above molar ratio, the mechanical properties such as modulus may be deteriorated. If the dicarbonyl compound is more than the dianhydride compound, the optical properties such as haze may be rapidly deteriorated, and the mechanical properties may be somewhat deteriorated.

As another embodiment, the dianhydride compound may be composed of one type, and the dicarbonyl compound may be composed of two types.

The polyamide-imide polymer comprises an imide repeat unit derived from the polymerization of the diamine compound and the dianhydride compound and an amide repeat unit derived from the polymerization of the diamine compound and the dicarbonyl compound.

The diamine compound is a compound that forms an imide bond with the dianhydride compound and forms an amide bond with the dicarbonyl compound, to thereby form a copolymer.

The diamine compound is not particularly limited, but it may be, for example, an aromatic diamine compound that contains an aromatic structure. For example, the diamine compound may be a compound represented by the following Formula 1.

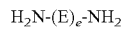  [Formula 1]

In Formula 1,

E may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

e is selected from integers of 1 to 5. When e is 2 or more, the Es may be the same as, or different from, each other.

(E)$_e$ in Formula 1 may be selected from the groups represented by the following Formulae 1-1a to 1-14a, but it is not limited thereto.

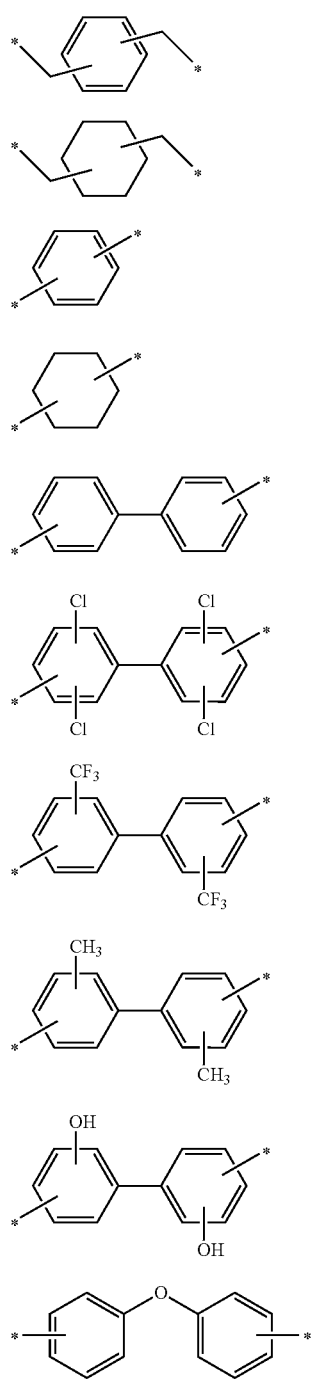

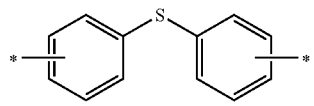

1-11a

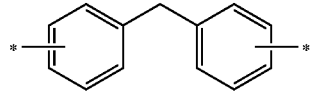

1-12a

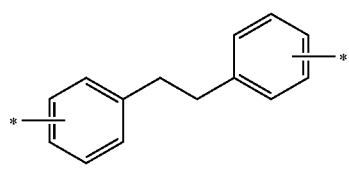

1-13a

*——(CH$_2$)$_a$——*   1-14a (n is selected from integers of 1 to 12)

Specifically, (E)$_e$ in Formula 1 may be selected from the groups represented by the following Formulae 1-1b to 1-13b, but it is not limited thereto:

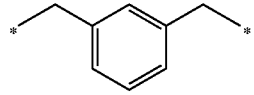

1-1b

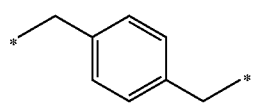

1-2b

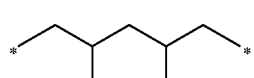

1-3b

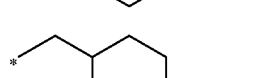

1-4b

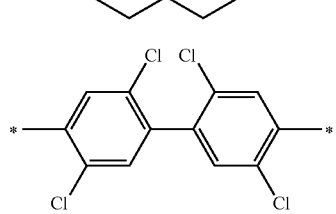

1-5b

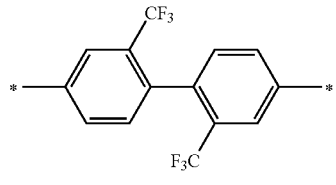

1-6b

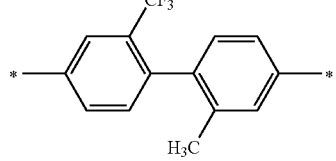

1-7b

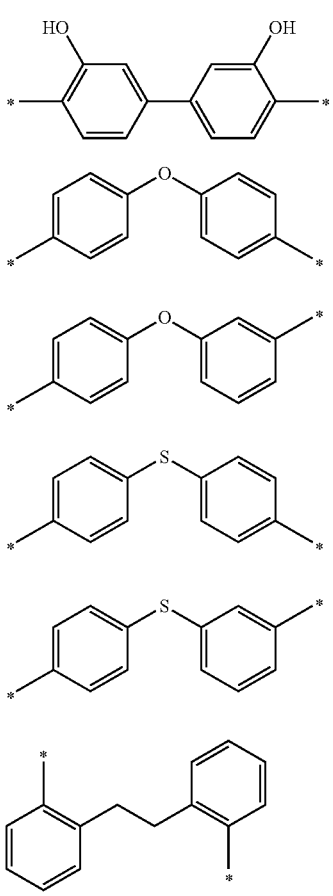

1-8b 1-9b 1-10b 1-11b 1-12b 1-13b

More specifically, $(E)_e$ in Formula 1 may be the group represented by the above Formula 1-6b or the group represented by the above Formula 1-9b.

In an embodiment, the diamine compound may comprise a compound having a fluorine-containing substituent or an ether group (—O—).

The diamine compound may be composed of a compound having a fluorine-containing substituent. In such event, the fluorine-containing substituent may be a fluorinated hydrocarbon group and specifically may be a trifluoromethyl group. But it is not limited thereto.

In another embodiment, one kind of diamine compound may be used as the diamine compound. That is, the diamine compound may be composed of a single component.

For example, the diamine compound may comprise 2,2'-bis(trifluoromethyl)-4,4'-diaminobiphenyl (TFDB) represented by the following formula, but it is not limited thereto.

TFDB

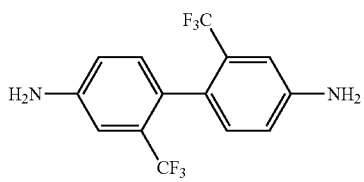

The dianhydride compound has a low birefringence value, so that it can contribute to enhancements in the optical properties such as transmittance of a film that comprises the polyimide-based polymer. The polyimide-based polymer refers to a polymer that contains an imide repeat unit.

The dianhydride compound is not particularly limited, but it may be, for example, an aromatic dianhydride compound that contains an aromatic structure. For example, the aromatic dianhydride compound may be a compound represented by the following Formula 2.

[Formula 2]

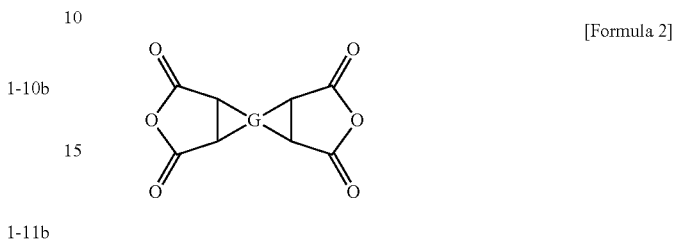

In Formula 2, G may be bonded by a bonding group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone or may be bonded to each other to form a condensed ring, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

G in Formula 2 may be selected from the groups represented by the following Formulae 2-1a to 2-9a, but it is not limited thereto.

2-1a 2-2a 2-3a 2-4a 2-5a

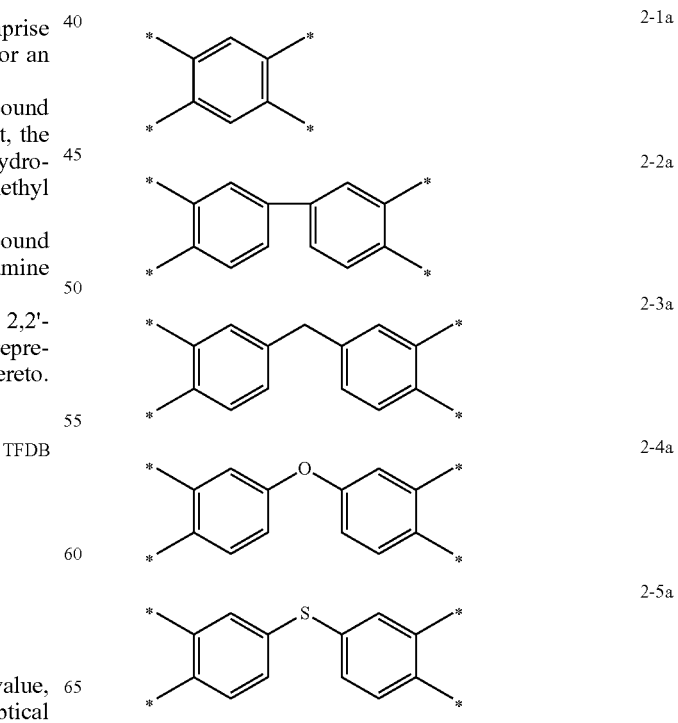

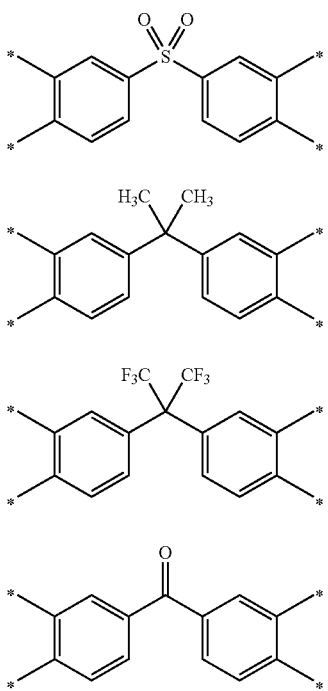

2-6a 2-7a 2-8a 2-9a

For example, G in Formula 2 may be the group represented by the above Formula 2-2a, the group represented by the above Formula 2-8a, or the group represented by the above Formula 2-9a.

In an embodiment, the dianhydride compound may comprise a compound having a fluorine-containing substituent, a compound having a biphenyl group, or a compound having a ketone group.

The dianhydride compound may be composed of a compound having a fluorine-containing substituent. In such event, the fluorine-containing substituent may be a fluorinated hydrocarbon group and specifically may be a trifluoromethyl group. But it is not limited thereto.

In another embodiment, the dianhydride compound may be composed of a single component or a mixture of two components.

For example, the dianhydride compound may comprise 2,2'-bis-(3,4-dicarboxyphenyl)hexafluoropropane dianhydride (6FDA) represented by the following formula, but it is not limited thereto.

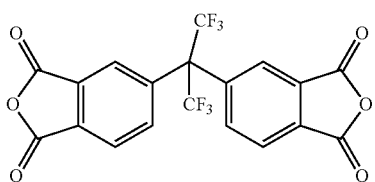

6-FDA

The diamine compound and the dianhydride compound may be polymerized to form a polyamic acid.

Subsequently, the polyamic acid may be converted to a polyimide through a dehydration reaction, and the polyimide comprises an imide repeat unit.

The polyimide may form a repeat unit represented by the following Formula A.

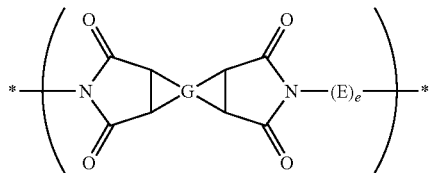

[Formula A]

In Formula A, E, G, and e are as described above.

For example, the polyimide may comprise a repeat unit represented by the following Formula A-1, but it is not limited thereto.

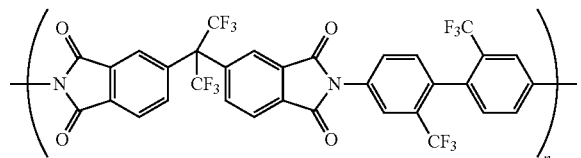

[Formula A-1]

In Formula A-1, n is an integer of 1 to 400.

The dicarbonyl compound is not particularly limited, but it may be, for example, a compound represented by the following Formula 3.

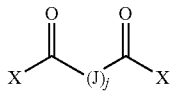

[Formula 3]

In Formula 3,

J may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

j is selected from integers of 1 to 5. When j is 2 or more, the Js may be the same as, or different from, each other.

X is a halogen atom. Specifically, X may be F, Cl, Br, I, or the like. More specifically, X may be Cl, but it is not limited thereto.

(J)$_j$ in Formula 3 may be selected from the groups represented by the following Formulae 3-1a to 3-14a, but it is not limited thereto.

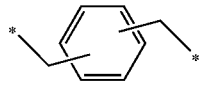

3-1a

3-2a

-continued

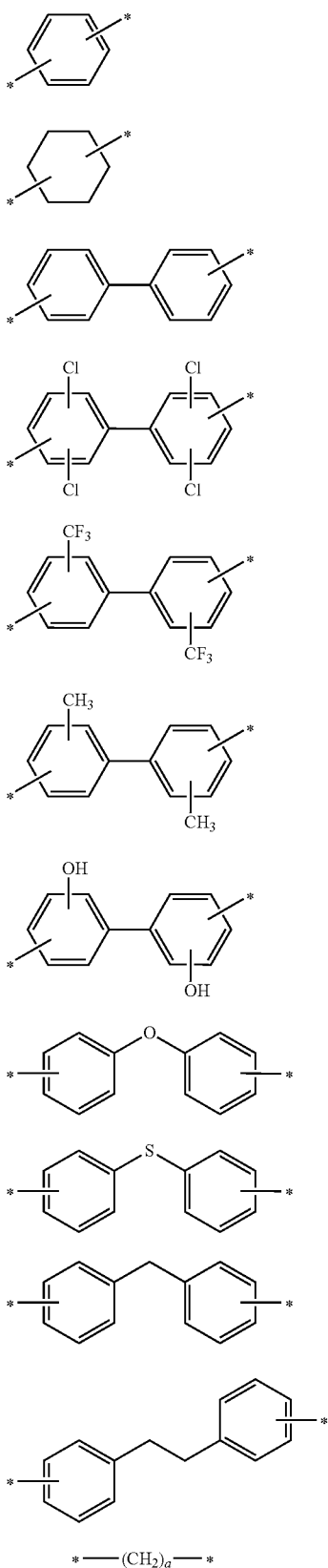

(n is selected from integers of 1 to 12)

Specifically, $(J)_j$ in Formula 3 may be selected from the groups represented by the following Formulae 3-1b to 3-8b, but it is not limited thereto.

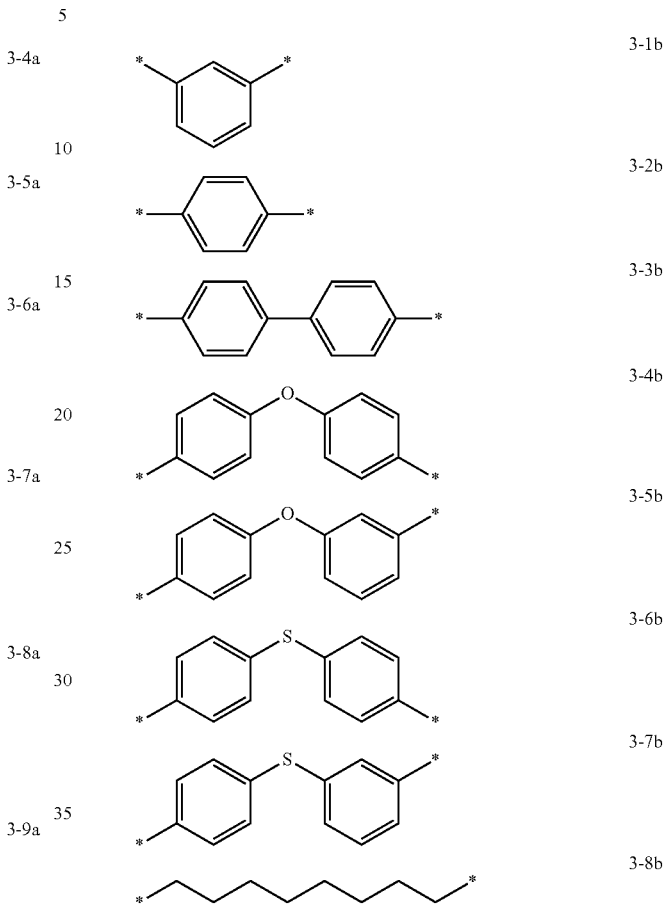

More specifically, $(J)_j$ in Formula 3 may be the group represented by the above Formula 3-1b, the group represented by the above Formula 3-2b, the group represented by the above Formula 3-3b, or the group represented by the above Formula 3-8b.

In an embodiment, a mixture of at least two kinds of dicarbonyl compounds different from each other may be used as the dicarbonyl compound. If two or more dicarbonyl compounds are used, at least two dicarbonyl compounds in which $(J)_j$ in the above Formula 3 is selected from the groups represented by the above Formulae 3-1b to 3-8b may be used as the dicarbonyl compound.

In another embodiment, the dicarbonyl compound may be an aromatic dicarbonyl compound that contains an aromatic structure.

For example, the dicarbonyl compound may comprise a first dicarbonyl compound and/or a second dicarbonyl compound.

The first dicarbonyl compound and the second dicarbonyl compound may be an aromatic dicarbonyl compound, respectively.

The first dicarbonyl compound and the second dicarbonyl compound may be compounds different from each other.

For example, the first dicarbonyl compound and the second dicarbonyl compound may be aromatic dicarbonyl compounds different from each other, but they are not limited thereto.

If the first dicarbonyl compound and the second dicarbonyl compound are an aromatic dicarbonyl compound, respectively, they comprise a benzene ring. Thus, they can contribute to improvements in the mechanical properties such as surface hardness and tensile strength of a film thus produced that comprises the polyamide-imide resin.

In addition, the first dicarbonyl compound and the second dicarbonyl compound are structural isomers to each other.

Specifically, the first dicarbonyl compound may be a compound having two carbonyl groups at the m-position, and the second dicarbonyl compound may be a compound having two carbonyl groups at the p-position, but they are not limited thereto.

The dicarbonyl compound may comprise terephthaloyl chloride (TPC), 1,1'-biphenyl-4,4'-dicarbonyl dichloride (BPDC), isophthaloyl chloride (IPC), as represented by the following formulae, or a combination thereof. But it is not limited thereto.

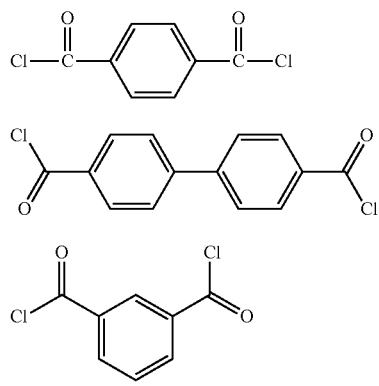

TPC

BPDC

IPC

For example, the first dicarbonyl compound may comprise BPDC, and the second dicarbonyl compound may comprise TPC, but they are not limited thereto.

If BPDC is used as the first dicarbonyl compound and TPC is used as the second dicarbonyl compound in a proper combination, a film that comprises the polyamide-imide resin thus produced may have high oxidation resistance.

Alternatively, the first dicarbonyl compound may comprise IPC, and the second dicarbonyl compound may comprise TPC, but they are not limited thereto.

If IPC is used as the first dicarbonyl compound and TPC is used as the second dicarbonyl compound in a proper combination, a film that comprises the polyamide-imide resin thus produced may not only have high oxidation resistance, but is also economical since the costs can be reduced.

The diamine compound and the dicarbonyl compound may be polymerized to form a repeat unit represented by the following Formula B.

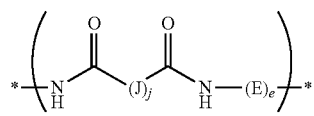

[Formula B]

In Formula B, E, J, e, and j are as described above.

For example, the diamine compound and the dicarbonyl compound may be polymerized to form amide repeat units represented by the following Formulae B-1 and B-2.

Alternatively, the diamine compound and the dicarbonyl compound may be polymerized to form amide repeat units represented by the following Formulae B-2 and B-3.

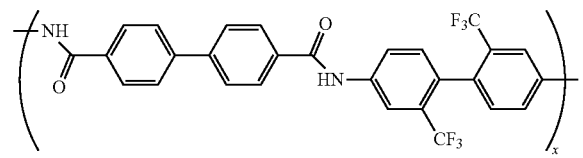

[Formula B-1]

In Formula B-1, x is an integer of 1 to 400.

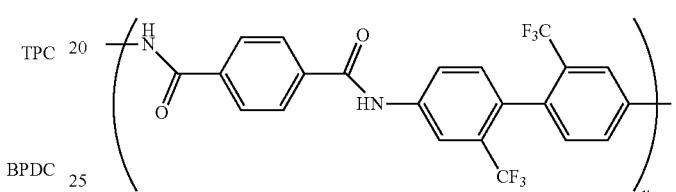

[Formula B-2]

In Formula B-2, y is an integer of 1 to 400.

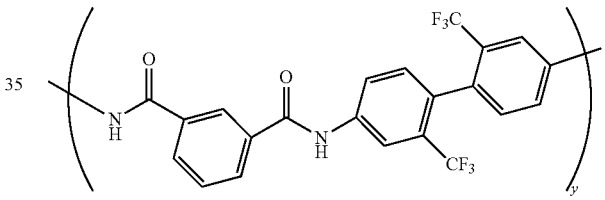

[Formula B-3]

In Formula B-3, y is an integer of 1 to 400.

According to an embodiment, the polyamide-imide polymer may comprise a repeat unit represented by the following Formula A and a repeat unit represented by the following Formula B:

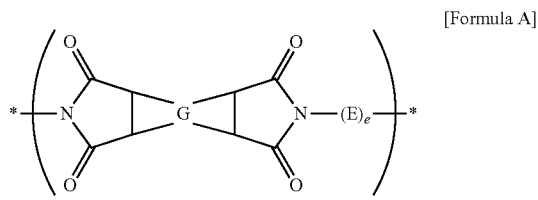

[Formula A]

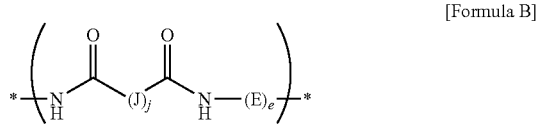

[Formula B]

In Formulae A and B,

E and J are each independently selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, C(=O)—, —CH(OH)—, —S(=O)$_2$—, —Si(CH$_3$)$_2$—, —C(CH$_3$)$_2$—, and —C(CF$_3$)$_2$—, e and j are each independently selected from integers of 1 to 5, when e is 2 or more, then the 2 or more Es are the same as, or different from, each other, when j is 2 or more, then the 2 or more Js are the same as, or different from, each other, G may be bonded by a bonding group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone or may be bonded to each other to form a condensed ring, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

In the polyamide-imide polymer, the molar ratio of the repeat unit represented by the above Formula A to the repeat unit represented by the above Formula B may be 2:98 to 50:50, but it is not limited thereto. Specifically, the molar ratio of the repeat unit represented by the above Formula A to the repeat unit represented by the above Formula B may be 2:98 to 45:55, 2:98 to 40:60, 2:98 to 30:70, 2:98 to 25:75, 3:97 to 25:75, 2:98 to 20:80, 3:97 to 20:80, 2:98 to 15:85, 3:97 to 15:85, 2:98 to 25:75, or 2:98 to 15:85. But it is not limited thereto.

If the molar ratio of the repeat unit represented by the above Formula A to the repeat unit represented by the above Formula B is within the above range, the polyamide-imide film is excellent in antiblocking properties, slip properties, folding characteristics, optical properties, and mechanical properties.

According to an embodiment, the polyimide-based film may have a transmittance of 80% or more. For example, the transmittance may be 85% or more, 88% or more, 80% to 99%, 85% to 99%, or 88% to 99%.

The polyamideimide film has a haze of 1% or less. Specifically, the haze may be 0.9% or less, but it is not limited thereto.

The polyamide-imide film has a yellow index of 3 or less. For example, the yellow index may be 2.9 or less or 2.8 or less, but it is not limited thereto.

The polyamide-imide film has a modulus of 5.0 GPa or more. Specifically, the modulus may be 5.5 GPa or more, 6.0 GPa or more, 6.5 GPa or more, 6.8 GPa or more, or 7.0 GPa or more, but it is not limited thereto.

The polyamide-imide film has a compressive strength of 0.4 kgf/μm or more. Specifically, the compressive strength may be 0.45 kgf/μm or more, or 0.46 kgf/μm or more, but it is not limited thereto.

When the polyamide-Imide film is perforated at a rate of 10 mm/min using a 2.5-mm spherical tip in a UTM compression mode, the maximum diameter (mm) of perforation including a crack is 60 mm or less. Specifically, the maximum diameter of perforation may be 5 to 60 mm, 10 to 60 mm, 15 to 60 mm, 20 to 60 mm, 25 to 60 mm, or 25 to 58 mm, but it is not limited thereto.

The polyamide-imide film has a surface hardness of HB higher. Specifically, the surface hardness may be H or higher, or 2H or higher, but it is not limited thereto.

The polyamide-imide film has a tensile strength of 15 kgf/mm$^2$ or more. Specifically, the tensile strength may be 18 kgf/mm$^2$ or more, 20 kgf/mm$^2$ or more, 21 kgf/mm$^2$ or more, or 22 kgf/mm$^2$ or more, but it is not limited thereto.

The polyamide-imide film has an elongation of 15% or more. Specifically, the elongation may be 16% or more, 17% or more, or 17.5% or more, but it is not limited thereto.

The polyamide-imide film according to an embodiment may secure excellent mechanical properties such as excellent folding characteristics and high modulus as well as excellent optical properties such as low haze, low yellow index (YI), and high transmittance. Thus, it is possible to impart long-term stable mechanical properties and optical properties to a substrate that requires transparency and flexibility in terms of modulus, elongation, tensile characteristics, and elastic restoring force.

The physical properties of the polyamide-imide film as described above are based on a thickness of 40 μm to 60 μm. For example, the physical properties of the polyimide-based film are based on a thickness of 50 μm.

The features on the components and properties of the polyamide-imide film as described above may be combined with each other.

In addition, the properties of the polyamide-imide film as described above are the results materialized by combinations of the chemical and physical properties of the components, which constitute the polyamide-imide film, along with the conditions in each step of the process for preparing the polyamide-imide film as described below.

Display Front Panel

The display front panel according to an embodiment comprises a polyamide-imide film and a functional layer.

The polyamide-imide film comprises a polyamide-imide polymer and a filler, and the FH value of the above Equation 1 is 0.5 or less.

The details on the polyamide-imide film are as described above.

The display front panel has excellent optical properties in terms of low haze and high transmittance, excellent flexural characteristics, strong resistance to scratches by virtue of high modulus and hardness, and excellent slip properties, resulting in few defects at the time of winding and unwinding. Thus, it can be advantageously applied to a display device.

Display Device

The display device according to an embodiment comprises a display unit; and a display front panel disposed on the display unit, wherein the display front panel comprises a polyamide-imide film.

The polyamide-imide film comprises a polyamide-imide polymer and a filler, and the FH value of the above Equation 1 is 0.5 or less.

The details on the polyamide-imide film and the display front panel are as described above.

FIG. 1 is a cross-sectional view of a display device according to an embodiment.

Specifically, FIG. 1 illustrates a display device, which comprises a display unit (400) and a front panel (300) disposed on the display unit (400), wherein the front panel comprises a polyimide-based film (100) having a first side (101) and a second side (102) and a functional layer (200), and an adhesive layer (500) is interposed between the display unit (400) and the front panel (300).

The display unit (400) is for displaying an image, and it may have flexible characteristics.

The display unit (400) may be a display panel for displaying an image. For example, it may be a liquid crystal display panel or an organic electroluminescent display panel. The organic electroluminescent display panel may comprise a front polarizing plate and an organic EL panel.

The front polarizing plate may be disposed on the front side of the organic EL panel. Specifically, the front polarizing plate may be attached to the side on which an image is displayed in the organic EL panel.

The organic EL panel displays an image by self-emission of a pixel unit. The organic EL panel may comprise an organic EL substrate and a driving substrate. The organic EL substrate may comprise a plurality of organic electroluminescent units, each of which corresponds to a pixel. Specifically, it may comprise a cathode, an electron transport layer, a light-emitting layer, a hole transport layer, and an anode. The driving substrate is operatively coupled to the organic EL substrate. That is, the driving substrate may be coupled to the organic EL substrate so as to apply a driving signal such as a driving current, so that the driving substrate can drive the organic EL substrate by applying a current to the respective organic electroluminescent units.

In addition, an adhesive layer (500) may be interposed between the display unit (400) and the front panel (300). The adhesive layer may be an optically transparent adhesive layer, but it is not particularly limited.

The front panel (300) is disposed on the display unit (400). The front panel is located at the outermost position of the display device to thereby protect the display unit.

The front panel (300) may comprise a polyamide-imide film and a functional layer. The functional layer may be at least one selected from the group consisting of a hard coating, a reflectance reducing layer, an antifouling layer, and an antiglare layer. The functional layer may be coated on at least one side of the polyamide-imide film.

Process for Preparing a Polyamide-Imide Film

An embodiment provides a process for preparing a polyamide-imide film.

The process for preparing a polyamide-imide film according to an embodiment comprises polymerizing a diamine compound, a dianhydride compound, and a dicarbonyl compound in an organic solvent to prepare a polyamide-imide polymer solution; adjusting the viscosity of the polyamide-imide polymer solution to 250,000 cps to 450,000 cps; adding a filler dispersion in which a filler is dispersed to the polymer solution; charging the polymer solution into a tank; extruding and casting the polymer solution in the tank and then drying it to prepare a gel sheet; and thermally treating the gel sheet.

Figure 2:
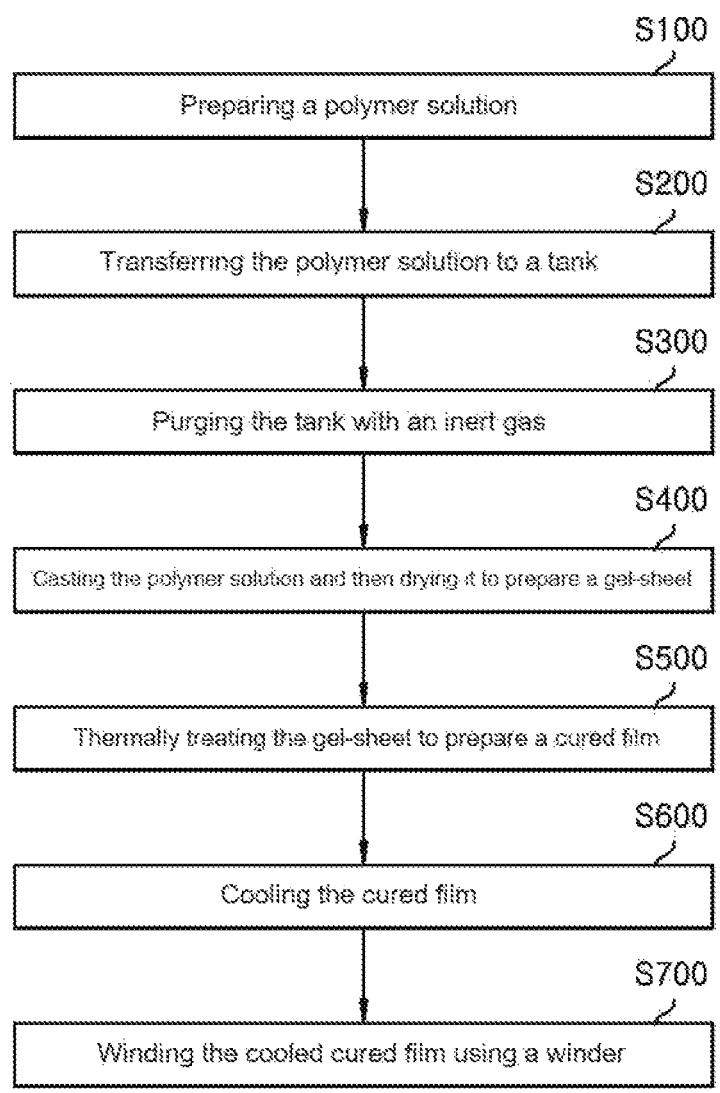
FIG. 2 is a schematic flow diagram of a process for preparing a polyamide-imide film according to an embodiment.

Referring to FIG. 2, the process for preparing a polyamide-imide film comprises simultaneously or sequentially mixing a diamine compound, a dianhydride compound, and a dicarbonyl compound in an organic solvent in a polymerization apparatus, and reacting the mixture to prepare a polymer solution (S100); charging the polymer solution to a tank (S200); purging with an inert gas (S300); casting the polymer solution in the tank onto a belt and then drying it to prepare a gel-sheet (S400); thermally treating the gel-sheet while it is moved to prepare a cured film (S500); cooling the cured film while it is moved (S600); and winding the cooled cured film using a winder (S700).

The polyamide-imide film is a film that comprises a polyamide-imide resin as a main component. The polyamide-imide resin is a resin that comprises, as a structural unit, an amide repeat unit and an imide repeat unit at a predetermined molar ratio.

In the process for preparing a polyamide-imide film, a polymer solution for preparing the polyamide-imide resin is prepared by simultaneously or sequentially mixing a diamine compound, a dianhydride compound, and a dicarbonyl compound in an organic solvent in a polymerization apparatus, and reacting the mixture (S100).

In an embodiment, the polymer solution may be prepared by simultaneously mixing and reacting a diamine compound, a dianhydride compound, and a dicarbonyl compound in an organic solvent.

In another embodiment, the step of preparing the polymer solution may comprise first mixing and reacting the diamine compound and the dianhydride compound in a solvent to produce a polyamic acid (PAA) solution; and second mixing and reacting the polyamic acid (PAA) solution and the dicarbonyl compound to form an amide bond aid an imide bond. The polyanic acid solution is a solution that comprises a polyamic acid.

Alternatively, the step of preparing the polymer solution may comprise first mixing and reacting the diamine compound and the dianhydride compound in a solvent to produce a polyamic acid solution; subjecting the polyamic acid solution to dehydration to produce a polyimide (P) solution; and second mixing and reacting the polyimide (P) solution and the dicarbonyl compound to further form an amide bond. The polyimide solution is a solution that comprises a polymer having an imide repeat unit.

In still another embodiment, the step of preparing the polymer solution may comprise first mixing and reacting the diamine compound and the dicarbonyl compound in a solvent to produce a polyamide (PA) solution; and second mixing and reacting the polyamide (PA) solution and the dianhydride compound to further form an imide bond. The polyamide solution is a solution that comprises a polymer having an amide repeat unit.

The polymer solution thus prepared may be a solution that comprises a polymer containing at least one selected from the group consisting of a polyamic acid (PAA) repeat unit, a polyamide (PA) repeat unit, and a polyimide (PI) repeat unit.

Alternatively, the polymer contained in the polymer solution comprises an imide repeat unit derived from the polymerization of the diamine compound and the dianhydride compound and an amide repeat unit derived from the polymerization of the diamine compound and the dicarbonyl compound.

The content of solids contained in the polymer solution may be 10% by weight to 30% by weight. Alternatively, the content of solids contained in the second polymer solution may be 15N by weight to 25% by weight, but it is not limited thereto.

If the content of solids contained in the polymer solution is within the above range, a polyamide-imide film can be effectively produced in the extrusion and casting steps. In addition, the polyamide-imide film thus produced may have excellent mechanical properties that are hardly deteriorated at high temperatures and high humidity and optical properties in terms of a low yellow index and the like.

In an embodiment, the step of preparing the polymer solution may further comprise introducing a catalyst.

Here, the catalyst may comprise at least one selected from the group consisting of beta picoline, acetic anhydride, isoquinoline (IQ), and pyridine-based compounds, but it is not limited thereto.

The catalyst may be added in an amount of 0.01 to 0.4 molar equivalent based on 1 mole of the polyamic acid, but it is not limited thereto.

The further addition of the catalyst may expedite the reaction rate and enhance the chemical bonding force between the repeat unit structures or that within the repeat unit structures.

In another embodiment, the process for preparing a polyamide-imide film may further comprise adjusting the viscosity of the polyamide-imide solution. Specifically, the process for preparing a polyamide-imide film may further comprise adjusting the viscosity of the polyamide-imide solution to 250,000 cps to 450,000 cps.

Specifically, the process for preparing a polyamide-imide film may comprise (a) simultaneously or sequentially mixing and reacting a diamine compound, a dianhydride compound, and a dicarbonyl compound in an organic solvent to prepare a first polymer solution; (b) measuring the viscosity of the first polymer solution and evaluating whether the target viscosity has been reached; and (c) if the viscosity of the first polymer solution does not reach the target viscosity, further adding the dicarbonyl compound to prepare a second polymer solution having the target viscosity.

The target viscosity may be 250,000 cps to 450,000 cps at room temperature. Specifically, the target viscosity may be 250,000 cps to 350,000 cps or 350,000 cps to 450,000 cps at room temperature, but it is not limited thereto.

In the steps of preparing the first polymer solution and the second polymer solution, the polymer solutions have viscosities different from each other. For example, the second polymer solution has a viscosity higher than that of the first polymer solution. Alternatively, the second polymer solution has a viscosity lower than that of the first polymer solution.

In the steps of preparing the first polymer solution and the second polymer solution, the stirring speeds are different from each other. For example, the stirring speed when the first polymer solution is prepared is faster than the stirring speed when the second polymer solution is prepared. Alternatively, the stirring speed when the first polymer solution is prepared is slower than the stirring speed when the second polymer solution is prepared.

In still another embodiment, the step of preparing the polymer solution may further comprise adjusting the pH of the polymer solution. In this step, the pH of the polymer solution may be adjusted to 4 to 7, for example 4.5 to 7.

The pH of the polymer solution may be adjusted by adding a pH adjusting agent. The pH adjusting agent is not particularly limited and may include, for example, amine-based compounds such as alkoxyamine, alkylamine, and alkanolamine.

If the pH of the polymer solution is adjusted to the above range, it is possible to prevent the damage to the equipment in the subsequent process, to prevent the occurrence of defects in the film produced from the polymer solution, and to achieve the desired optical properties and mechanical properties in terms of yellow index and modulus.

The pH adjusting agent may be employed in an amount of 0.1% by mole to 10% by mole based on the total number of moles of monomers in the polymer solution.

In another embodiment, the step of preparing the polymer solution may further comprise purging the tank with an inert gas. The step of purging the tank with an inert gas may remove moisture, reduce impurities, increase the reaction yield, and impart excellent surface appearance and mechanical properties to the film finally produced.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The molar ratio of the dianhydride compound to the dicarbonyl compound used to prepare the polymer solution may be 2:98 to 50:50. Specifically, the molar ratio of the dianhydride compound and the diarbonyl compound is 2:98 to 45:55, 2:98 to 40:60, 2:98 to 30:70, 2:98 to 25:75, 3:97 to 25:75, 2:98 to 20:80, 3:97 to 20:80, 2:98 to 15:85, 3:97 to 15:85, 2:98 to 25:75, or 2:98 to 15:85. But it is not limited thereto.

If the dianhydride compound and the dicarbonyl compound are employed in the above molar ratio, it is advantageous for achieving a desired level of such mechanical properties as antiblocking properties, folding characteristics, and modulus, and such optical properties as haze and transmittance of the polyamide-imide film prepared from the polymer solution.

The details on the diamine compound, the dianhydride compound, and the dicarbonyl compound are as described above.

In an embodiment, the organic solvent may be at least one selected from the group consisting of dimethylformamide (DMF), dimethylacetamide (DMAc), N-methyl-2-pyrrolidone (NMP), m-cresol, tetrahydrofuran (THF), and chloroform. The organic solvent employed in the polymer solution may be dimethylacetamide (DMAc), but it is not limited thereto.

Once the polymer solution comprising a polyamide-imide resin in an organic solvent has been prepared as described above, a filler dispersion in which a filler has been dispersed is added to the solution.

Here, the details on the filler are as described above.

Specifically, the filler may be a silica-based material.

The filler dispersion may further comprise a dispersant.

The dispersant serves to help the filler in the dispersion to be uniformly dispersed in the polymer solution comprising a polyimide-based resin.

In such event, the dispersant is preferably a neutral dispersant.

The content of solids contained in the filer dispersion is 10% by weight to 30% by weight.

If the content of the filler contained in the filler dispersion is within the above range, the filler may be uniformly dispersed and appropriately mixed with the polymer solution comprising a polyimide-based resin. In addition, the aggregation of the filler is minimized, no feeling of foreign matter is present on the film surface when a film is prepared, and the optical properties and mechanical properties of the film can be enhanced together.

In addition, the filler dispersion may further comprise a solvent.

The solvent may be an organic solvent. Specifically, it may be at least one selected from the group consisting of dimethylformamide (DMF), dimethylacetamide (DMAc), N-methyl-2-pyrrolidone (NMP), in-cresol, tetrahydrofuran (THF), and chloroform. Preferably, the solvent contained in the filler dispersion may be dimethylacetamide (DMAc), but it is not limited thereto.

Next, after the step of preparing the polymer solution, the polymer solution is charged to a tank (S200).

Figure 3:
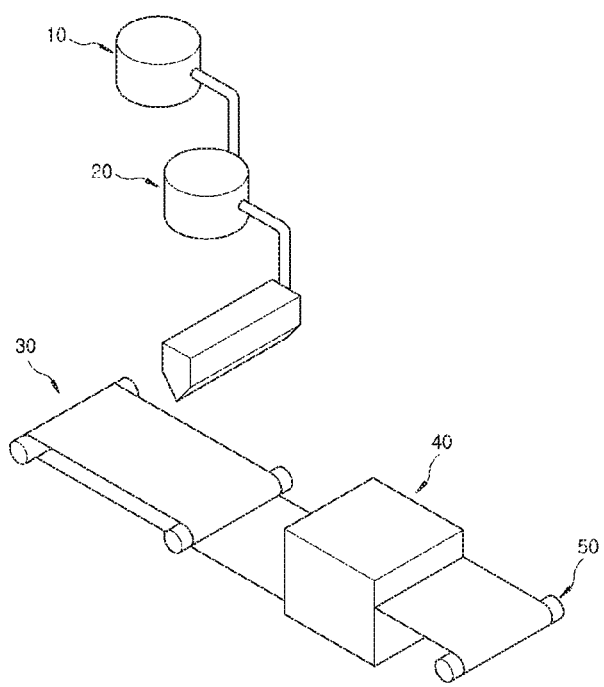
FIG. 3 schematically illustrates process facilities for preparing a polyamide-imide film according to an embodiment.

FIG. 3 schematically illustrates process facilities for preparing a polyamide-imide film according to an embodiment. Referring to FIG. 3, the polymer solution as described above is prepared in a polymerization apparatus (10), and the polymer solution thus produced is transferred to, and stored, in a tank (20).

Here, once the polymer solution has been prepared, the step of transferring the polymer solution to the tank is carried out without any additional steps. Specifically, the polymer solution prepared in the polymerization apparatus is transferred to, and stored in, the tank without any separate precipitation and redissolution steps for removing impurities. In the conventional process, in order to remove impurities such as hydrochloric acid (HC) generated during the preparation of a polymer solution, the polymer solution thus prepared is purified through a separate step to remove the impurities, and the purified polymer solution is then redissolved in a solvent. In this case, however, there has been a problem that the loss of the active ingredient increases in the step of removing the impurities, resulting in decreases in the yield.

Accordingly, the preparation process according to an embodiment ultimately minimizes the amount of impurities generated in the step of preparing the polymer solution or properly controls the impurities in the subsequent steps, even if a certain amount of impurities is present, so as not to deteriorate the physical properties of the final film. Thus, the process has an advantage in that a film is produced without separate precipitation or redissolution steps.

The tank (20) is a place for storing the polymer solution before forming it into a film, and its internal temperature may be −20° C. to 20°.

Specifically, the internal temperature may be −20° C. to 10° C., −20° C. to 5° C., −20° C. to 0° C., or 0° C. to 10° C., but it is not limited thereto.

If the internal temperature of the tank (20) is controlled to the above range, it is possible to prevent the polymer solution from deteriorating during storage, and it is possible to lower the moisture content to thereby prevent defects of the film produced therefrom.

The process for preparing a polyamide-imide film may further comprise carrying out vacuum degassing of the polymer solution transferred to the tank (20).

The vacuum degassing may be carried out for 30 minutes to 3 hours after depressurizing the internal pressure of the tank to 0.1 bar to 0.7 bar. The vacuum degassing under these conditions may reduce bubbles in the polymer solution. As a result, it is possible to prevent surface defects of the film produced therefrom and to achieve excellent optical properties such as haze.

In addition, the process for preparing a polyamide-imide film may further comprise purging the polymer solution transferred to the tank (20) with an inert gas (S300).

Specifically, the purging is carried out by purging the tank with an inert gas at an internal pressure of 1 atm to 2 atm. The nitrogen purging under these conditions may remove moisture in the polymer solution, reduce impurities to thereby increase the reaction yield, and achieve excellent optical properties such as haze and mechanical properties.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The step of vacuum degassing and the step of purging the tank with an inert gas are performed in a separate process, respectively.

For example, the step of vacuum degassing may be carried out, followed by the step of purging the tank with an inert gas, but it is not limited thereto.

The step of vacuum degassing and/or the step of purging the tank with an inert gas may improve the physical properties of the surface of the polyamide-imide film thus produced.

Thereafter, the process may further comprise storing the polymer solution in the tank (20) for 1 hour to 360 hours. Here, the temperature inside the tank may be kept at −20° C. to 20° C.

The process for preparing a polyamide-imide film may further comprise extruding and casting the polymer solution in the tank (20) and then drying it to prepare a gel-sheet (S400).

The polymer solution may be cast onto a casting body such as a casting roll or a casting belt.

Referring to FIG. 3, according to an embodiment, the polymer solution may be applied onto a casting belt (30) as a casting body, and it is dried while it is moved to be made into a sheet in the form of a gel.

When the polymer solution is injected onto the belt (30), the injection rate may be 300 g/min to 700 g/min. If the injection rate of the polymer solution satisfies the above range, the gel-sheet can be uniformly formed to an appropriate thickness.

In addition, the casting thickness of the polymer solution may be 200 μm to 700 μm. If the polymer solution is cast to a thickness within the above range, the final film produced after the drying and thermal treatment may have an appropriate and uniform thickness.

As described above, the viscosity of the polymer solution at room temperature may be 100,000 cps to 500,000 cps, for example, 100,000 cps to 400,000 cps, 100,000 cps to 350,000 cps, 150,000 cps to 350,000 cps, or 150,000 cps to 250,000 cps. If the viscosity satisfies the above range, the polymer solution can be cast onto a belt in a uniform thickness without defects.

The polymer solution is cast and then dried at a temperature of 80° C. to 150° C. to prepare a gel-sheet. Specifically, the drying temperature may be 100° C. to 150° C., 100° C. to 135° C., or 125° C. to 135° C., but it is not limited thereto.

Specifically, the polymer solution is cast and then dried at the above drying temperature for 5 minutes to 60 minutes to prepare a gel-sheet. The solvent of the polymer solution is partially or totally volatilized during the drying to prepare the gel-sheet.

In the process for preparing a polyamide-imide film, the VT value according to the following Equation 2 is 160 or more.

$$VT = \frac{PV}{5,000 \text{ cps}} + \frac{DT}{1° \text{ C.}} \quad \text{[Equation 2]}$$

In Equation 2, PV is the adjusted viscosity of the polymer solution (cps), and DT stands for the drying temperature (° C.).

Specifically, the VT value may be 160 or more, 170 or more, 180 or more, 185 or more, 160 to 200, 170 to 200, 180 to 200, or 185 to 200, but it is not limited thereto.

The properties of the polyamide-imide film as described above are the results materialized by combinations of the components, which constitute the polyamide-imide film, and their contents, along with the conditions in each step of the process for preparing the film. In order to secure excellent mechanical and optical properties of the polyamide-imide film according to an embodiment, the VT value, which is a parameter associated with the viscosity and drying temperature of the polymer solution, is preferably 160 or more.

In the process for preparing a polyamide-imide film, the VT value falls within the above range by adjusting the viscosity of the polymer solution and the drying temperature, whereby it is possible to achieve an advantageous effect of enhanced antiblocking and slip properties attributable to the addition of a filler without increasing the haze.

Specifically, if the VT vale is less than the above range, the filler used serves as a nucleus, whereby a film having an increased haze and yellow index may be produced, and it may be unsuitable for application in a subsequent process since a feeling of foreign matter is present on the film surface.

The moving speed of the gel-sheet on the casting body at the time of drying may be 0.1 m/min to 15 m/min, for example, 0.5 m/min to 10 m/mM, but it is not limited thereto.

The process for preparing a polyamide-imide film comprises thermally treating the gel-sheet while it is moved to prepare a cured film (S500).

Referring to FIG. 3, the thermal treatment of the gel-sheet may be carried out by passing it through a thermosetting device (40).

The thermal treatment of the gel-sheet is carried out in the temperature range of 80° C. to 500° C. for 5 to 180 minutes. Specifically, the thermal treatment of the gel-sheet may be carried out in the temperature range of 80° C. to 500° C. at a temperature elevation rate of 2° C./min to 80° C./min for 5 minutes to 150 minutes.

According to an embodiment, the gel-sheet may be treated with hot air.

If the thermal treatment is carried out with hot air, the heat may be uniformly supplied. If the heat is not uniformly supplied, satisfactory mechanical properties cannot be achieved. In particular, a satisfactory surface roughness cannot be achieved, which may raise or lower the surface tension too much.

According to an embodiment, the thermal treatment of the gel-sheet may be carried out in two or more steps.

According to another embodiment, the thermal treatment may be carried out until the content of the residual solvent contained in the gel-sheet is 1,000 ppm or less.

Specifically, the thermal treatment comprises a first thermal treatment step carried out for 5 to 30 minutes in the range of 60° C. to 120° C.; and a second thermal treatment step carried out for 30 minutes to 120 minutes in the range of 150° C. to 350° C.

In the thermal treatment, the second thermal treatment step is carried out after the first thermal treatment step. In such event, if the content of the organic solvent contained in the gel-sheet exceeds 1,000 ppm upon the second thermal treatment step, a third thermal treatment step may be additionally carried out.

For example, the third thermal treatment step may be carried out in the range of 200° C. to 350° C. until the content of the residual solvent contained in the gel-sheet is 1,000 ppm or less.

In addition, in the thermal treatment step, the gel-sheet may be stretched by 1.01 times to 1.05 times in the MD direction. The gel-sheet may be stretched by 1.01 times to 1.05 times in the MD direction between the first thermal treatment step and the second thermal treatment step.

In the thermal treatment step, the gel-sheet may be stretched by 1.01 times to 1.05 times in the TD direction. In the second thermal treatment step, the gel-sheet may be stretched by 1.01 times to 1.05 times in the TD direction.

The gel-sheet may be simultaneously stretched by 1.01 times to 1.05 times in the MD direction and in the TD direction. The gel-sheet may be sequentially stretched by 1.01 times to 1.05 times in the MD direction and then by 1.01 times to 1.05 times in the TD direction.

The thermal treatment under these conditions may cure the gel-sheet to have an appropriate surface hardness and modulus, and the cured film thus prepared may have excellent folding characteristics, optical properties, and mechanical properties at high temperatures and high humidity.

The process for preparing a polyamide-imide film comprises cooling the cured film while it is moved (S600).

Referring to FIG. 3, the cooling of the cured film is carried out after it has been passed through the thermosetting device (40). It may be carried out by using a separate cooling chamber (not shown) or by forming an appropriate temperature atmosphere without a separate cooling chamber.

The step of cooling the cured film while it is moved may comprise a first temperature lowering step of reducing the temperature at a rate of 100° C./min to 1,000° C./min and a second temperature lowering step of reducing the temperature at a rate of 40° C./min to 400° C./min.

In such event, specifically, the second temperature lowering step is performed after the first temperature lowering step. The temperature lowering rate of the first temperature lowering step may be faster than the temperature lowering rate of the second temperature lowering step.

For example, the maximum rate of the first temperature lowering step is faster than the maximum rate of the second temperature lowering step. Alternatively, the minimum rate of the first temperature lowering step is faster than the minimum rate of the second temperature lowering step.

If the step of cooling the cured film is carried in such a multistage manner, it is possible to have the physical properties of the cured film further stabilized and to maintain the optical properties and mechanical properties of the film achieved during the curing step more stably for a long period of time.

The moving speed of the gel-sheet and the moving speed of the cured film are the same.

The process for preparing a polyamide-imide film comprises winding the cooled cured film using a winder (S700).

Referring to FIG. 3, the cooled cured film may be wound using a roll-shaped winder (50).

In such event, the ratio of the moving speed of the gel-sheet on the belt at the time of drying to the moving speed of the cured film at the time of winding is 1:0.95 to 1:1.40. Specifically, the ratio of the moving speeds may be 1:0.99 to 1:1.20, 1:0.99 to 1:1.10, or 1:1.0 to 1:1.05, but it is not limited thereto.

If the ratio of the moving speeds is outside the above range, the mechanical properties of the cured film may be impaired, and the flexibility and elastic properties may be deteriorated.

In the process for preparing a polyamide-imide film, the thickness variation (%) according to the following Relationship 1 may be 3% to 30%. Specifically, the thickness variation (%) may be 5% to 20%, but it is not limited thereto.

$$\text{Thickness variation } (\%) = (M1 - M2)/M2 \times 100 \qquad \text{[Relationship 1]}$$

In Relationship 1, M1 is the thickness (μm) of the gel-sheet, and M2 is the thickness (μm) of the cooled cured film at the time of winding.

The polyamide-imide film is prepared by the preparation process as described above such that it is excellent in optical and mechanical properties. The polyamide-imide film may be applicable to various uses that require slip properties and transparency. For example, the polyamide-imide film may be applied to solar cells, displays, semiconductor devices, sensors, and the like.

The details on the polyamide-imide film prepared by the process for preparing a polyamide-imide film are as described above.

Hereinafter, the above description will be described in detail by referring to examples. However, these examples are set forth to illustrate the present invention, and the scope of the present invention is not limited thereto.

EXAMPLE

Example 1

A 1-liter glass reactor equipped with a temperature-controllable double jacket was charged with 585.68 g of dimethylacetamide (DMAc) as an organic solvent at 20° C. under a nitrogen atmosphere. Then, 2,2'-bis(trifluoromnethyl)-4,4'-diaminobiphenyl (TFMB) was slowly added thereto for dissolution thereof. Subsequently, 2,2'-bis(3,4-dicarboxyphenyl)hexafluoropropane dianhydride (6FDA) was slowly added thereto, and the mixture was stirred for 1 hour. Then, isophthaloyl chloride (IPC) was added, followed by stirring for 1 hour. And terephthaloyl chloride (TPC) was added, followed by stirring for 1 hour, thereby preparing a polymer solution. Thereafter, a solution of 10% by weight of a dicarbonyl compound (a TPC solution in a solvent of DMAc) was slowly added under stirring until the viscosity of the polymer solution reached 250,000 cps. Subsequently, a solution in which silica particles had been dispersed was added to the polymer solution whose viscosity had been adjusted, which was stirred. Here, the content of the added silica (average particle diameter of 80 nm to 100 nm) was 500 ppm based on the total weight of the polymer solids.

The polymer solution thus prepared was charged to a tank. The polymer solution in the tank was coated on a glass plate, which was dried with hot air at about 135° C. for 20 minutes to prepare a gel-sheet. The gel-sheet was detached from the glass plate and then fixed to a pin frame. The fixed gel-sheet was thermally treated at about 270° C. for 30 minutes to obtain a polyamide-imide film having a thickness of 50 μm.

As to the contents of TFMB, 6FDA, TPC, and IPC, the number of moles of the dianhydride compound and the dicarbonyl compounds based on 100 moles of the diamine compound is shown in Table 1.

Examples 2 and 3 and Comparative Examples 1 to 5

Films were prepared in the same manner as in Example 1, except that the types and contents of the respective reactants, the viscosity of the polymer solution, the drying temperature, and the like were changed as shown in Table 1 below.

EVALUATION EXAMPLE

The films prepared in Examples 1 to 3 and Comparative Examples 1 to 5 were each measured and evaluated for the following properties. The results are shown in Table 1 below.

Evaluation Example 1; Measurement of Film Thickness

The thickness was measured at 5 points in the transverse direction using a digital micrometer 547-401 manufactured by Mitutoyo Corporation. Their average value was adopted as the thickness.

Evaluation Example 2: Measurement of Viscosity of the Polymer Solution

BH II equipment of TOKI SANGYO was used to measure the viscosity of the polymer solution.

Evaluation Example 3: Measurement of Transmittance and Haze

The light transmittance and the haze at 550 nm were measured using a haze meter NDH-5000W manufactured by Nippon Denshoku Kogyo.

Evaluation Example 4: Measurement of Yellow Index

The yellow index (YI) was measured with a spectrophotometer (UltraScan PRO, Hunter Associates Laboratory) using a CIE colorimetric system.

Evaluation Example 5: Measurement of Modulus

A sample was cut out by at least 5 cm in the direction perpendicular to the main shrinkage direction of the film and by 10 cm in the main shrinkage direction. It was fixed by the clips disposed at intervals of 5 cm in a universal testing machine UTM 5566A of Instron. A stress-strain curve was obtained until the sample was fractured while it was stretched at a rate of 5 mm/min at room temperature. The slope of the load with respect to the initial strain on the stress-strain curve was taken as the modulus (GPa).

TABLE 1

| | Ex. 1 | Ex. 2 | Ex. 3 | C. Ex. 1 | C. Ex. 2 | C. Ex. 3 | C. Ex. 4 | C. Ex. 5 |
|---|---|---|---|---|---|---|---|---|
| Diamine | TFMB | TFMB | TFMB | TFMB | TFMB | TFMB | TFMB | TFMB |
| | 100 | 100 | 100 | 100 | 100 | 100 | 100 | 100 |
| Dianhydride | 6FDA | 6FDA | 6FDA | 6FDA | — | 6FDA | 6FDA | 6FDA |
| | 3 | 3 | 3 | 3 | | 52 | 3 | 3 |
| Dicarbonyl | TPC | TPC | TPC | TPC | TPC | TPC | TPC | TPC |
| compound | 72 | 72 | 72 | 72 | 100 | 48 | 72 | 72 |
| | IPC | IPC | IPC | BPDC | — | — | IPC | IPC |
| | 25 | 25 | 25 | 25 | | | 25 | 25 |
| Imide molar ratio | 3 | 3 | 3 | 3 | 0 | 52 | 3 | 3 |
| Amide molar ratio | 97 | 97 | 97 | 97 | 100 | 48 | 97 | 97 |

TABLE 1-continued

|  | Ex. 1 | Ex. 2 | Ex. 3 | C. Ex. 1 | C. Ex. 2 | C. Ex. 3 | C. Ex. 4 | C. Ex. 5 |
|---|---|---|---|---|---|---|---|---|
| Additive type | Silica | Silica | Silica | Silica | Silica | Silica | Silica | Silica |
| Additive content (FC) (ppm) | 500 | 500 | 500 | 500 | 500 | 500 | 500 | 500 |
| Transmittance (%) | 88.7 | 88.9 | 89.2 | 88.1 | 87.4 | 89.0 | 87.7 | 87.8 |
| Haze (HZ) (%) | 0.9 | 0.6 | 0.4 | 1.2 | 2.8 | 0.7 | 2.2 | 2.3 |
| Yellow index | 2.8 | 2.5 | 2.4 | 3.5 | 8.2 | 2.6 | 6.3 | 6.6 |
| Modulus (GPa) | 7.2 | 7.0 | 7.1 | 6.9 | 5.2 | 4.3 | 7.1 | 7.0 |
| FH value | 0.225 | 0.15 | 0.1 | 0.3 | 0.7 | 0.175 | 0.55 | 0.575 |
| Viscosity of polymer solution | 250,000 | 350,000 | 450,000 | 250,000 | 250,000 | 250,000 | 150,000 | 450,000 |
| Drying temp. | 135 | 125 | 100 | 125 | 125 | 125 | 105 | 60 |
| VT value | 185 | 195 | 190 | 175 | 175 | 175 | 135 | 150 |

As can be seen from Table 1, the polyamide-imide films of Examples 1 to 3 had a low haze and a low yellow index and excellent modulus as compared with the films of Comparative Examples 1 to 5, indicating that their mechanical properties and optical properties were excellent.

In particular, in the case of the polyamide-imide films of Examples 1 to 3, the FH value associated with the content of the filler and the haze satisfied 0.5 or less, and the VT value associated with the viscosity and the drying temperature of the polymer solution when the polyamide-imide film was prepared satisfied 160 or higher. Thus, they were excellent in not only antiblocking properties but also mechanical properties and optical properties.

In contrast, in Comparative Example 1, the two types of dicarbonyl compounds used in the polymer production were not structural isomers to each other. Here, the haze and yellow index were high, indicating that the optical properties were deteriorated. In Comparative Example 2, the amide repeat unit was 100%, and the FH value was high. Here, the haze and yellow index were remarkably high, so that it was inappropriate for use in display front panels and display devices. In Comparative Example 3, the imide repeat unit was greater than the amide repeat unit in the polymer. Here, such physical properties as modulus were somewhat low. In addition, in Comparative Examples 4 and the FH values were 0.55 and 0.575, respectively, which exceeded 0.5, and the VT values were less than 160. Here, the haze was 2 or more, and the yellow index was 6 or more, indicating that the optical properties were significantly deteriorated.

REFERENCE NUMERALS OF THE DRAWINGS

10: polymerization apparatus
20: tank
30: belt
40: thermosetting device
50: winder
100: polyamide-imide film
101: first side
102: second side
200: functional layer
300: front panel
400: display unit
500: adhesive layer

The invention claimed is:

1. A polyamide-imide film, which comprises a polyamide-imide polymer formed by polymerizing a diamine compound, a dianhydride compound, and a dicarbonyl compound; and a filler,
   wherein the filler has an average particle diameter of 70 nm to 120 nm,
   wherein, the dicarbonyl compound comprises a first dicarbonyl compound and a second dicarbonyl compound,
   wherein the first dicarbonyl compound and the second dicarbonyl compound are structural isomers to each other,
   wherein the dianhydride compound comprises 2,2'-bis-(3,4-dicarboxyphenyl)hexafluoropropane dianhydride (6FDA), the first dicarbonyl compound is a compound having two carbonyl groups at the m-position, and the second dicarbonyl compound is a compound having two carbonyl groups at the p-position,
   wherein the molar ratio of the dianhydride compound and the dicarbonyl compound is 2:98 to 45:55,
   wherein a content of a residual solvent in the polyamide-imide film is 900 ppm or less,
   wherein the FH value of the following Equation 1 is less than 0.3, and
   wherein the IS value represented by the following Equation 3 is 5 to 100:

$$FH = \frac{FC}{2000 \text{ ppm}} \times \frac{HZ}{1\%} \qquad \text{[Equation 1]}$$

wherein, in Equation 1, FC is the content (ppm) of the filler based on the total weight of the solids content in the polymer, and HZ stands for the haze (%) of the film, $$IS = IM + RS/10 \qquad \text{[Equation 3]}$$

wherein, in Equation 3, IM stands for the number of moles of an imide repeat unit when the total number of moles of the imide repeat unit and an amide repeat unit in the film is 100; and RS stands for the content (ppm) of the residual solvent in the film.

2. The polyamide-imide film of claim 1, wherein the filler is a silica-based material.

3. The polyamide-imide film of claim 1, wherein the content of the filler is 300 ppm to 2,000 ppm based on the total weight of the solids content of the polyamide-imide polymer.

4. The polyamide-imide film of claim 1, which has a transmittance of 80% or more, a haze of 1% or less, a yellow index of 3 or less, and a modulus of 5 GPa or more.

5. A display front panel, which comprise a polyamide-imide film and a functional layer, wherein the polyamide-imide film comprises a polyamide-imide polymer and a filler, and the FH value of the following Equation 1 is less than 0.3,
   wherein the polyamide-imide polymer is formed by polymerizing a diamine compound, a dianhydride compound, and a dicarbonyl compound,
   wherein the dicarbonyl compound comprises a first dicarbonyl compound and a second dicarbonyl compound,
   wherein the first dicarbonyl compound and the second dicarbonyl compound are structural isomers to each other,
   wherein the dianhydride compound comprises 2,2'-bis-(3,4-dicarboxyphenyl)hexafluoropropane dianhydride (6FDA), the first dicarbonyl compound is a compound having two carbonyl groups at the m-position, and the second dicarbonyl compound is a compound having two carbonyl groups at the p-position,
   wherein the molar ratio of the dianhydride compound and the dicarbonyl compound is 2:98 to 45:55,
   wherein the filler has an average particle diameter of 70 nm to 120 nm,
   wherein the IS value represented by the following Equation 3 is 5 to 100, $$FH = \frac{FC}{2000 \text{ ppm}} \times \frac{HZ}{1\%} \qquad \text{[Equation 1]}$$

wherein, in Equation 1, FC is the content (ppm) of the filler based on the total weight of the solids content in the polymer, and HZ stands for the haze (%) of the film,
   wherein a content of a residual solvent in the polyamide-imide film is 900 ppm or less, and $$IS = IM + RS/10 \qquad \text{[Equation 3]}$$

wherein, in Equation 3, IM stands for the number of moles of an imide repeat unit when the total number of moles of the imide repeat unit and an amide repeat unit in the film is 100; and RS stands for the content (ppm) of the residual solvent in the film.

6. A display device, which comprises a display unit; and a display front panel disposed on the display unit,
   wherein the display front panel comprises a polyamide-imide film,
   wherein the polyamide-imide film comprises a polyamide-imide polymer and a filler,
   wherein the polyamide-imide polymer is formed by polymerizing a diamine compound, a dianhydride compound, and a dicarbonyl compound,
   wherein the dicarbonyl compound comprises a first dicarbonyl compound and a second dicarbonyl compound,
   wherein the first dicarbonyl compound and the second dicarbonyl compound are structural isomers to each other,
   wherein the dianhydride compound comprises 2,2'-bis-(3,4-dicarboxyphenyl)hexafluoropropane dianhydride (6FDA), the first dicarbonyl compound is a compound having two carbonyl groups at the m-position, and the second dicarbonyl compound is a compound having two carbonyl groups at the p-position,
   wherein the molar ratio of the dianhydride compound and the dicarbonyl compound is 2:98 to 45:55,
   wherein the filler has an average particle diameter of 70 nm to 120 nm, and the FH value of the following Equation 1 is less than 0.3,
   wherein the IS value represented by the following Equation 3 is 5 to 100:

$$FH = \frac{FC}{2000 \text{ ppm}} \times \frac{HZ}{1\%} \qquad \text{[Equation 1]}$$

wherein, in Equation 1, FC is the content (ppm) of the filler based on the total weight of the solids content in the polymer, and HZ stands for the haze (%) of the film, and $$IS = IM + RS/10 \qquad \text{[Equation 3]}$$

wherein, in Equation 3, IM stands for the number of moles of an imide repeat unit when the total number of moles of the imide repeat unit and an amide repeat unit in the film is 100; and RS stands for the content (ppm) of the residual solvent in the film, wherein a content of a residual solvent in the polyamide-imide film is 900 ppm or less.

7. The polyamide-imide film of claim 1, wherein the diamine compound comprises 2,2'-bis(trifluoromethyl)-4,4'-diaminobiphenyl (TFDB).

* * * * *